United States Patent
Mehta et al.

(10) Patent No.: US 10,313,926 B2
(45) Date of Patent: Jun. 4, 2019

(54) LARGE RECEIVE OFFLOAD (LRO) PROCESSING IN VIRTUALIZED COMPUTING ENVIRONMENTS

(71) Applicant: Nicira, Inc., Palo Alto, CA (US)

(72) Inventors: Rishi Mehta, Palo Alto, CA (US); Boon Ang, Palo Alto, CA (US); Guolin Yang, Palo Alto, CA (US); Wenyi Jiang, Palo Alto, CA (US); Jayant Jain, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 43 days.

(21) Appl. No.: 15/609,037

(22) Filed: May 31, 2017

(65) Prior Publication Data
US 2018/0352474 A1   Dec. 6, 2018

(51) Int. Cl.
| | |
|---|---|
| H04W 28/06 | (2009.01) |
| G06F 9/455 | (2018.01) |
| H04L 12/803 | (2013.01) |
| H04L 12/861 | (2013.01) |
| H04L 29/06 | (2006.01) |
| H04L 12/927 | (2013.01) |

(52) U.S. Cl.
CPC ...... *H04W 28/065* (2013.01); *G06F 9/45558* (2013.01); *H04L 47/125* (2013.01); *H04L 49/90* (2013.01); *G06F 2009/45595* (2013.01); *H04L 47/80* (2013.01); *H04L 69/161* (2013.01)

(58) Field of Classification Search
CPC ............. H04W 28/065; G06F 9/45558; H04L 47/125; H04L 49/90
See application file for complete search history.

(56) References Cited

U.S. PATENT DOCUMENTS

| | | |
|---|---|---|
| 6,047,323 A | 4/2000 | Krause |
| 6,496,935 B1 | 12/2002 | Fink et al. |
| 7,079,544 B2 | 7/2006 | Wakayama et al. |
| 7,606,260 B2 | 10/2009 | Oguchi et al. |
| 8,214,522 B2 | 7/2012 | Chanda |

(Continued)

OTHER PUBLICATIONS

Muhammad Bilal Anwer et al., "Building a Fast, Virtualized Data Plane with Programmable Hardware", VISA'09, ACM, Aug. 17, 2009, Barcelona, Spain.

(Continued)

*Primary Examiner* — Ronald B Abelson
(74) *Attorney, Agent, or Firm* — Su IP Consulting (57) ABSTRACT

Example methods are provided for a host to perform large receive offload (LRO) processing in a virtualized computing environment. The method may comprise receiving, via a physical network interface controller (NIC), incoming packets that are destined for the virtualized computing instance, and processing the incoming packets to generate at least one processed packet using a networking service pipeline that includes a packet aggregation service and multiple networking services. The packet aggregation service may be configured to aggregate the incoming packets into an aggregated packet and enabled at a service point along the networking service pipeline based on an LRO capability of at least one of the multiple networking services to process the aggregated packet. The method may also comprise forwarding the at least one processed packet generated by the networking service pipeline to the virtualized computing instance.

15 Claims, 6 Drawing Sheets

(56) References Cited

U.S. PATENT DOCUMENTS

| | | | |
|---|---|---|---|
| 8,306,062 | B1 | 11/2012 | Cohen |
| 8,341,286 | B1 | 12/2012 | Craft et al. |
| 8,462,632 | B1 | 6/2013 | Vincent |
| 8,825,900 | B1 | 9/2014 | Gross, IV et al. |
| 8,856,518 | B2 | 10/2014 | Sridharan et al. |
| 8,990,422 | B1 | 3/2015 | Usmani et al. |
| 9,225,661 | B1 | 12/2015 | Yang et al. |
| 9,288,135 | B2 | 3/2016 | DeCusatis et al. |
| 9,356,866 | B1 * | 5/2016 | Sivaramakrishnan ............... H04L 12/4633 |
| 9,384,033 | B2 | 7/2016 | Jain et al. |
| 9,397,857 | B2 | 7/2016 | Gross, IV et al. |
| 2001/0007128 | A1 | 7/2001 | Lambert et al. |
| 2005/0053079 | A1 | 3/2005 | Havala |
| 2006/0029056 | A1 | 2/2006 | Perera et al. |
| 2006/0206655 | A1 | 9/2006 | Chappell et al. |
| 2007/0007128 | A1 | 1/2007 | Tomyo et al. |
| 2007/0014246 | A1 | 1/2007 | Aloni et al. |
| 2007/0022212 | A1 | 1/2007 | Fan |
| 2007/0255866 | A1 | 11/2007 | Aloni et al. |
| 2007/0280243 | A1 | 12/2007 | Wray et al. |
| 2008/0019274 | A1 | 1/2008 | Droux et al. |
| 2008/0267177 | A1 | 10/2008 | Johnson et al. |
| 2008/0275989 | A1 * | 11/2008 | Ebersole ............... 709/225 |
| 2008/0310420 | A1 | 12/2008 | Aloni et al. |
| 2009/0161547 | A1 | 6/2009 | Riddle et al. |
| 2010/0165874 | A1 | 7/2010 | Brown et al. |
| 2010/0275199 | A1 | 10/2010 | Smith et al. |
| 2010/0287304 | A1 | 11/2010 | Chanda |
| 2010/0322265 | A1 | 12/2010 | Gopinath et al. |
| 2011/0023029 | A1 | 1/2011 | Diab et al. |
| 2012/0002535 | A1 | 1/2012 | Droux et al. |
| 2012/0079478 | A1 | 3/2012 | Galles et al. |
| 2012/0250512 | A1 | 10/2012 | Jagadeeswaran et al. |
| 2012/0250530 | A1 | 10/2012 | Jagadeeswaran et al. |
| 2013/0019042 | A1 | 1/2013 | Ertugay et al. |
| 2013/0033993 | A1 | 2/2013 | Cardona et al. |
| 2013/0100960 | A1 | 4/2013 | Tsirkin et al. |
| 2013/0259036 | A1 | 10/2013 | Tamir et al. |
| 2014/0056151 | A1 | 2/2014 | Petrus et al. |
| 2014/0115578 | A1 | 4/2014 | Cooper et al. |
| 2014/0157265 | A1 | 6/2014 | Alanis et al. |
| 2014/0157267 | A1 | 6/2014 | Alanis et al. |
| 2014/0233588 | A1 | 8/2014 | Chudgar et al. |
| 2014/0280442 | A1 | 9/2014 | Jiang et al. |
| 2015/0055468 | A1 | 2/2015 | Agarwal et al. |
| 2015/0081948 | A1 | 3/2015 | Thereska et al. |
| 2015/0263968 | A1 | 9/2015 | Jain et al. |
| 2015/0263974 | A1 | 9/2015 | Jain et al. |
| 2017/0366605 | A1 * | 12/2017 | Chang ............... H04L 29/08 |

OTHER PUBLICATIONS

"Network Virtualization in Multi-tenant Datacenters", Technical Report, VMware, Inc., Aug. 2013.

Joshua Levasseur et al., "Standardized but Flexible I/O for Self-Virtualizing Devices", 2008.

Larry L. Peterson et al., "OS Support for General-Purpose Routers", Department of Computer Science, Princeton University.

Justin Pettit et al., "Virtual Switching in an Era of Advanced Edges", Sep. 2010.

Tammo Spalink et al., "Building a Robust Software-Based Router Using Network Processors", Department of Computer Science, Princeton University, 2001, pp. 216-229.

Jon Turner et al., "Supercharging PlanetLab—A High Performance, Multi-Application, Overlay Network Platform", SIGCOMM'07, Aug. 27-31, 2007.

"Network Functions Virtualisation; Infrastructure Architecture; Architecture of the Hypervisor Domain", Draft ETSI GS NFV-INF 004 V0.3.1, May 2014.

\* cited by examiner

LARGE RECEIVE OFFLOAD (LRO) PROCESSING IN VIRTUALIZED COMPUTING ENVIRONMENTS

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Datacenter (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. In practice, a host may be configured to support large receive offload (LRO) in which multiple incoming packets are aggregated to form a larger packet. LRO processing reduces the number of packets that need to be processed before transmission to an end node (e.g., virtual machine) to increase throughput and reduce CPU overhead. Conventionally, LRO processing is typically a feature of a host's physical network interface controller (NIC). The feature is either switched on or off for all traffic received via the physical NIC.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to large receive offload (LRO) processing will now be explained in more detail using FIG. 1, which is a schematic diagram illustrating example virtualized computing environment 100 in which LRO processing may be performed. It should be understood that, depending on the desired implementation, virtualized computing environment 100 may include additional and/or alternative components than that shown in FIG. 1.

Figure 1:
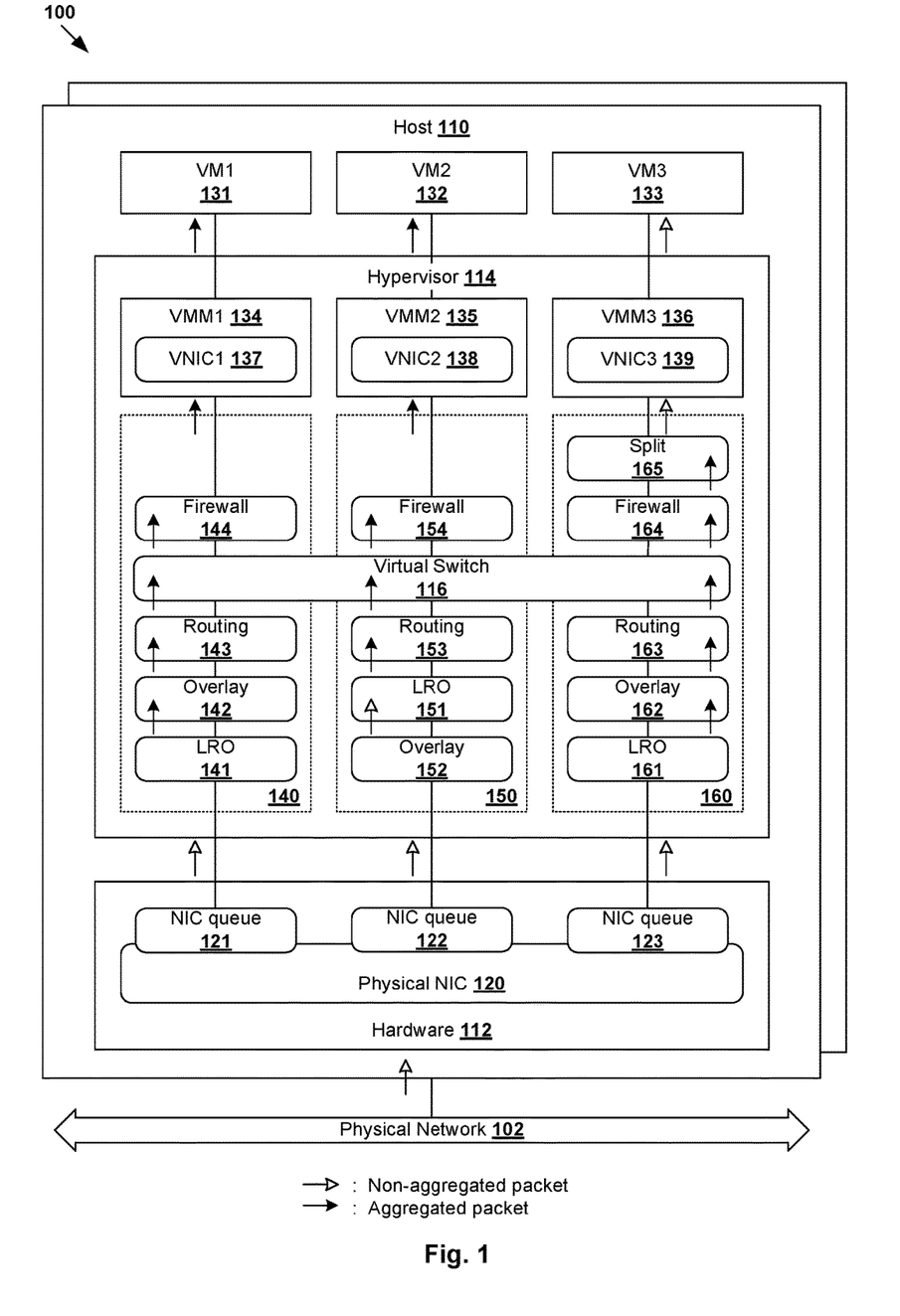
FIG. 1 is a schematic diagram illustrating an example virtualized computing environment in which large receive offload (LRO) processing may be performed.

In the example in FIG. 1, virtualized computing environment 100 includes multiple hosts 110 that are inter-connected via physical network 102. Each host 110 includes suitable hardware 112 and virtualization software (e.g., hypervisor 114) to support various virtual machines, such as VM1 131, VM2 132 and VM3 133. In practice, virtualized computing environment 100 may include any number of hosts (also known as a "computing devices", "host computers", "host devices", "physical servers", "server systems", etc.), where each host may be supporting tens or hundreds of virtual machines.

Although examples of the present disclosure refer to virtual machines, it should be understood that a "virtual machine" running on host 110 is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers, client computers, etc. The virtual machines may also be complete computational environments, containing virtual equivalents of the hardware and software components of a physical computing system. As used herein, the term "hypervisor" may refer generally to a software layer or component that supports the execution of multiple virtualized computing instances, including system-level software that supports namespace containers such as Docker, etc.

Hypervisor 114 maintains a mapping between underlying hardware 112 and virtual resources allocated to virtual machine 131/132/133. Hardware 112 includes suitable physical components (not all shown for simplicity), such as central processing unit (CPU), memory (e.g., random access memory), storage disk (e.g., solid state drive, hard disk drive), and physical network interface controllers (PNIC) 120, etc. Virtual resources are allocated to virtual machine 131/132/133 to support a guest operating system and application(s), etc. For example, corresponding to hardware 112, the allocated virtual resources may include virtual CPU, virtual memory, virtual disk, virtual network interface controller (VNIC), etc. Hypervisor 114 further implements virtual machine monitors (VMMs) 134, 135, 136 to emulate hardware resources, such as VNIC1 137, VNIC2 138 and VNIC3 139 for respective VM1 131, VM2 132 and VM3 133. VMM 134/135/136 usually maintains state information of VNIC 137/138/139 that is migrated along with corresponding virtual machine 131/132/133.

Physical NIC 120 includes a set of NIC queues 121-123 for holding incoming packets that are received from physical network 102. This allows incoming traffic to be distributed among NIC queues 121-123 using queue filters. Each queue filter may be defined using any suitable attribute, such as a destination address (e.g., destination Media Access Control (MAC) address, destination Internet Protocol (IP) address, etc.), five-tuple information of a communication flow (e.g., source IP address, destination IP address, source port number, destination port number, protocol, etc.), overlay network information (e.g., logical network identifier), etc. The term "packet" may refer generally to a group of bits that can be transported together from a source to a destination, such as message, segment, datagram, etc.

NIC queues 121, 122, 123 are associated with respective networking service pipelines 140, 150, 160 that represent separate threads for packet processing. With advancements in software-defined networking (SDN), various networking services may be implemented in software to process incoming packets. For example in FIG. 1, networking service pipeline 140/150/160 (also known as a "service stack") includes overlay service 142/152/162, routing service 143/153/163, switching service implemented by virtual switch 116 and firewall service 144/154/164.

Overlay service 142/152/162 may be configured to process packets based on overlay network information in each packet's outer header. In practice, a logical network (also known as "overlay network") may be implemented using any suitable tunneling protocol, such as Virtual eXtensible Local Area Network (VXLAN), Stateless Transport Tunneling (STT), Generic Network Virtualization Encapsulation (GENEVE), etc. To facilitate communication among members of a particular logical network that reside on different hosts, packets are encapsulated with an outer (tunnel) header with overlay network information such as logical network identifier, MAC address and IP address associated with a virtual tunnel endpoint (VTEP) implemented by hypervisor 114, etc. Overlay service 142/152/162 performs decapsulation to remove the outer header before the packets are further processed and forwarded to their destination virtual machine.

In practice, overlay service 142/152/162 may be implemented one or more VTEPs implemented by hypervisor 114. A VTEP (e.g., VXLAN tunnel endpoint) may be configured with its own port connection to virtual switch 116, as well as its own IP address. Overlay packets entering host 110 would be addressed to a particular VTEP. In one example, in response to receiving an incoming overlay packet having an outer header addressed to the VTEP's IP address, the packet may be forwarded (e.g., by virtual switch 116) to the VTEP based on the outer header. The VTEP would then decapsulate the packet and send the decapsulated packet (i.e., having an inner header but without the outer header) to virtual switch 116. After being processed by the rest of networking service pipeline 140/150/160, the packet will be forwarded to the destination virtual machine.

Routing service 143/153/163 and virtual switch 116 may be configured to process packets based on respective layer-3 information and layer-2 information in each packet's inner header. The term "layer-2" may refer generally to a Media Access Control (MAC) layer; and "layer-3" to a network or Internet Protocol (IP) layer in the Open System Interconnection (OSI) model, although the concepts described herein may be used with other networking models. In some embodiments, hypervisor 114 may implement multiple logical switches and logical routers that connect virtual machines residing on different hosts. Logical switches, logical routers and logical networks may be configured using any suitable management entities (not shown for simplicity), such as an SDN manager residing on a management plane, an SDN controller residing on a central control plane, etc. One example of an SDN controller is the NSX controller component of VMware NSX® (available from VMware, Inc.), in which case the SDN manager may be an NSX manager component.

Further, firewall service 144/154/164 is implemented to protect host 110 against security threats caused by unwanted packets. Based on a set of firewall rules (e.g., configured by a network administrator), firewall service 144/154/164 filters packets to and from virtual machine 131/132/133. In practice, networking service pipeline 140/150/160 may include any alternative or additional networking services, such as network address translation (NAT), virtual private network (VPN), distributed load balancing, intrusion prevention system (IPS), intrusion detection system (IDS), etc. Each networking service represents a "bump in the wire" along a data path leading to a virtual machine. Although represented as a series of networking services in FIG. 1, some of the networking services may be performed in parallel, rearranged, repeated or omitted depending on the desired implementation.

To perform the above networking services, hypervisor 114 generally requires access to header information of the incoming packets, leaving the payload information unchanged. As a result, the cost associated with these networking services is a per-packet cost, irrespective of the packet size. At a very high packet rate, these networking services can quickly consume a lot of CPU resources and eventually limiting the overall number of packets that can be processed by hypervisor 114.

To reduce the cost (in terms of performance impact, e.g., CPU cycles) of packet processing, LRO processing may be performed to aggregate multiple incoming packets into one large packet. For transport contol protocol (TCP) traffic, for example, multiple packets from the same TCP flow may be aggregated to form an LRO packet. This reduces the number of packets processed by networking service pipeline 140/150/160 as well by network stacks (not shown, but may reside within VMs 131-133) thereby improving throughput and CPU efficiency. Conventionally, however, LRO processing is generally performed using hardware at physical NIC 120 before packets are processed using overlay service 142/152/162, routing service 143/153/163, virtual switch 116 and firewall service 144/154/164. This can cause issues for networking services and/or virtual machines that cannot handle large, aggregated packets.

LRO Processing

Figure 2:
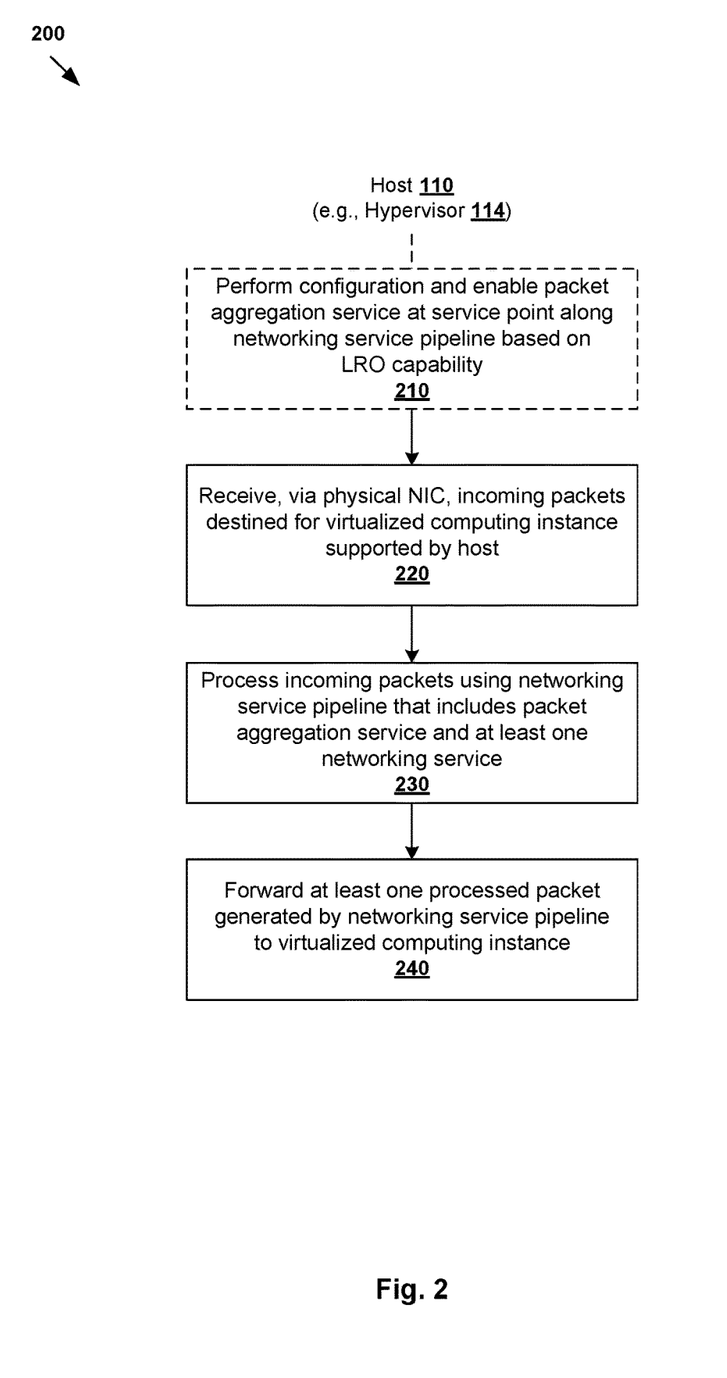
FIG. 2 is a flowchart of an example process for a host to perform LRO processing in a virtualized computing environment.

According to examples of the present disclosure, LRO processing may be implemented in an improved manner using software at any suitable service point along networking service pipeline 140/150/160. In more detail, FIG. 2 is a flowchart of example process 200 for host 110 to perform LRO processing in virtualized computing environment 100. This should be contrasted against conventional hardware implementation at physical NIC 120, which generally has dedicated hardware to perform packet aggregation at NIC queue 121/122/123. Example process 200 may include one or more operations, functions, or actions illustrated by one or more blocks, such as 210 to 240. The various blocks may be combined into fewer blocks, divided into additional blocks, and/or eliminated depending on the desired implementation. Block 210 is shown in dashed line to indicate that configuration of packet aggregation service 141/151/161 may be performed independently from LRO processing at blocks 220, 230 and 240.

At 210 in FIG. 2, networking service pipeline 140/150/160 may be configured to include packet aggregation service 141/151/161 and multiple networking services (e.g., overlay, routing, switching, firewall, etc.). Packet aggregation service 141/151/161 (also referred to as LRO service) may be configured to aggregate incoming packets into an aggregated packet and enabled at a service point along networking service pipeline 140/150/160 based on an LRO capability of at least one of the multiple networking services to process the aggregated packet. Here, the term "LRO capability" may refer generally to the ability of processing or handling large, aggregated packets. The term "service point" may refer generally to any suitable position along networking service pipeline 140/150/160, such as before or after at least one networking service, between two networking services, etc.

At 220 in FIG. 2, incoming packets that are destined for a virtualized computing instance (e.g., VM1 131) supported by host 110 are received via NIC queue 121/122/123 at physical NIC 120. At 230 in FIG. 2, the incoming packets are processed using networking service pipeline 140/150/160. Based on the configuraton at 210 in FIG. 2, the incoming packets may be aggregated at the service point at which packet aggregation service 141/142/142 is enabled along networking service pipeline 140/150/160. At 240 in FIG. 2, at least one processed packet generated by networking service pipeline 140/150/160 is forwarded to the virtualized computing instance (e.g., VM1 131).

For example in FIG. 1, host 110 implements different configurations for illustrative purposes. At first networking service pipeline 140, packet aggregation service 141 is enabled at a service point before overlay service 142, routing service 143, virtual switch 116 and firewall service 144, all of which have LRO capability. At second networking service pipeline 150, since overlay service 152 does not have LRO capability, packet aggregation service 151 is enabled at a service point after overlay service 152 but before other networking services that have LRO capability. See also white-headed arrows indicating small (non-aggregated) packets, and black-headed arrows indicating large (aggregated) packets. As will be described further using FIG. 3 and FIG. 4, NIC queues 121, 122 associated with networking service pipelines 140, 150 may be assigned to a pool associated with virtual machines 131-132 having LRO capability.

According to examples of the present disclosure, packet aggregation may be enabled regardless of the LRO capability of the associated virtual machine. For example in FIG. 1, VM1 131 and VM2 132 both have LRO capability, while VM3 133 does not. At third networking service pipeline 140, packet aggregation service 161 is enabled at a service point before overlay service 162, routing service 163, virtual switch 116 and firewall service 164 based on their LRO capability. Additionally, since VM3 133 does not have LRO capability, third networking service pipeline 140 may be configured with packet splitting service 165 to split up large, aggregated packets into smaller, non-aggregated packets before they are forwarded to VM3 133. Packet splitting service 165 may be implemented when, for example, the cost of packet splitting is relatively low (e.g., within an acceptable range) compared to the improvement in terms of CPU efficiency and throughput provided by networking services that have LRO capability. As will be described further using FIG. 3, FIG. 5 and FIG. 6, packet splitting may be performed based on packet boundary information to maintain packet boundary.

Detailed Process

Figure 3:
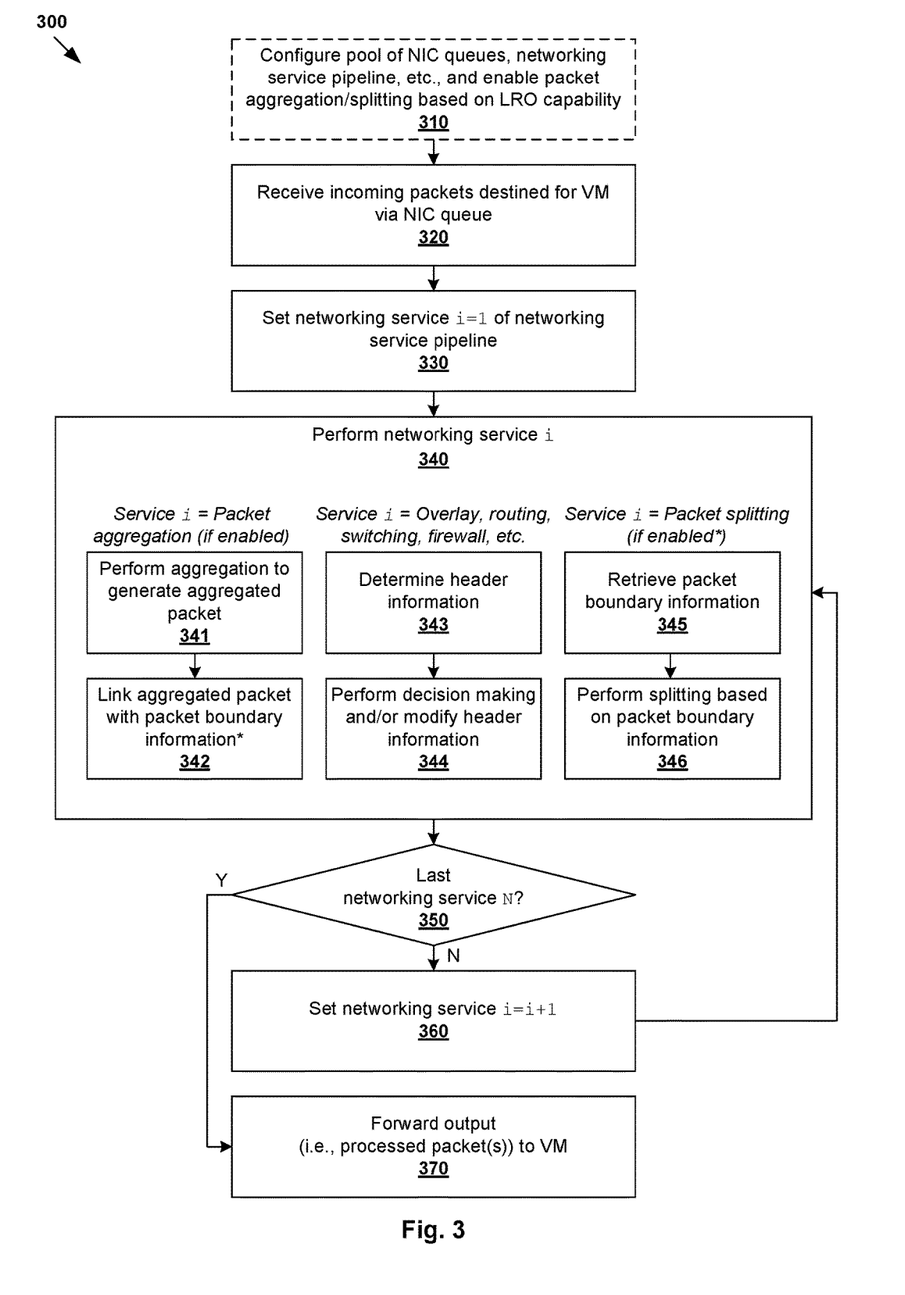
FIG. 3 is a flowchart of an example detailed process for a host perform LRO processing in a virtualized computing environment.

FIG. 3 is a flowchart of example detailed process 300 for host 110 to perform LRO processing in virtualized computing environment 100. Example process 300 may include one or more operations, functions, or actions illustrated by one or more blocks, such as 310 to 370. The various blocks may be combined into fewer blocks, divided into additional blocks, and/or eliminated depending on the desired implementation. Block 310 is shown in dashed line to indicate that the configuration step may be performed independently from subsequent blocks 320 to 370. Example process 300 will be discussed using FIG. 4, FIG. 5 and FIG. 6, which illustrate various issues that may be addressed by examples of the present disclosure. Similar to the example in FIG. 1, white-headed arrows are used to indicate small (non-aggregated) packets, and black-headed arrows to indicate large (aggregated) packets in FIG. 4, FIG. 5 and FIG. 6.

(a) LRO-Aware Queue Assignment

One issue relating to packet aggregation is that host 110 may support virtual machines that have LRO capability, as well as those that do not. As discussed using FIG. 1, one approach is to perform packet aggregation and splitting for virtual machines that do not have LRO capability (e.g., VM3 133). According to examples of the present disclosure, another approach is to rely on (if available) the ability of physical NIC 120 to perform traffic segregation. In this case, packet aggregation may be selectively activated or enabled for virtual machines that have LRO capability, and deactivated or disabled for those that do not. This avoids the need for any subsequent packet splitting, which may be costly to implement in practice (e.g., when it is difficult to maintain the original packet boundary after packets are processed by other networking services, etc.).

Some examples will be described using FIG. 4, which is a schematic diagram illustrating first example 400 of LRO processing in virtualized computing environment 100. To implement traffic segregation, a software pool of multiple NIC queues may be configured to handle incoming packets for virtual machines that support large packets according to block 310 in FIG. 3. In the example in FIG. 4, pool 405 (represented using a dotted box) includes first NIC queue 121 and second NIC queue 122 to hold incoming packets destined for VM1 131 and VM2 132. Third NIC queue 123 (not in pool 405) is to hold incoming packets destined for VM3 133.

Based on physical NIC's 120 awareness of the LRO capability of virtual machines 131-133, queue assignment may be configured to distribute incoming packets among NIC queues 121-123. For example, using a flitration feature of physical NIC 120, queue assignment may be based on any suitable header information of an incoming packet, such as destination address (e.g., destination MAC address, destination IP address), five-tuple identifier of a particular TCP connection (e.g., source IP address, source port number, destination IP address, destination port number, protocol), overlay network information (e.g., logical network identifier, VTEP's MAC address, VTEP's IP address), a combination thereof, etc. The header information may be extracted from an outer header or inner header of the incoming packet.

The configuration at block 310 may further involve selectively activating or enabling packet aggregation service 141/151 at a service point along networking service pipeline 140/150 associated with NIC queue 121/122 assigned to pool 405. Further, packet aggregation service 161 is disabled (i.e., status=OFF) at networking service pipeline 160 associated with third NIC queue 123. Hypervisor 114 may also dynamically adjust the number of NIC queues allocated to pool 405 based on the number of virtual machines that have LRO capability, the amount of traffic destined for such virtual machines, etc. Although one-to-one mapping between NIC queue 121/122/123 between virtual machine 131/132/133 is shown, it should be understood that multiple virtual machines may share a particular NIC queue.

During packet processing, incoming packets destined for VM1 131 may be processed according to example process 300 in FIG. 3. According to block 320 in FIG. 3, incoming packets labelled "A," "B" and "C" (see 410 in FIG. 4) are retrieved from first NIC queue 121 belonging to pool 405.

The incoming packets are then processed using first networking service pipeline 140 associated with first NIC queue 121 according to blocks 330, 340, 350 and 360. In particular, packet aggregation service 141 (service i=1) aggregates the incoming packets into an aggregated packet according to block 341 in FIG. 3. As shown at 412 in FIG. 4, the aggregated packet includes an outer header (labelled "O"), an inner header (labelled "I"), and payload information of the smaller incoming packets (labelled "A," "B" and "C").

The aggregated packet is then processed by subsequent networking services, which involve any suitable decision making (e.g., routing, switching, firewall, etc.) and/or modification of the packet's header information according to blocks 343 and 344 in FIG. 3. For example, overlay service 142 (i=2) performs decapsulation to remove the outer header (labelled "O"), resulting in a decapsulated aggregated packet with an inner header (labelled "I") addressed to destination VM1 131 (see 414 in FIG. 4). Subsequent packet processing is performed by routing service 143 (i=3), virtual switch 116 (i=4) and firewall service 144 (i=5). Once all networking services are performed, the output (i.e., processed aggregated packet) is forwarded to VM1 131 via VNIC1 137 (see 416 in FIG. 4). See corresponding blocks 350 and 370 in FIG. 3.

Figure 4:
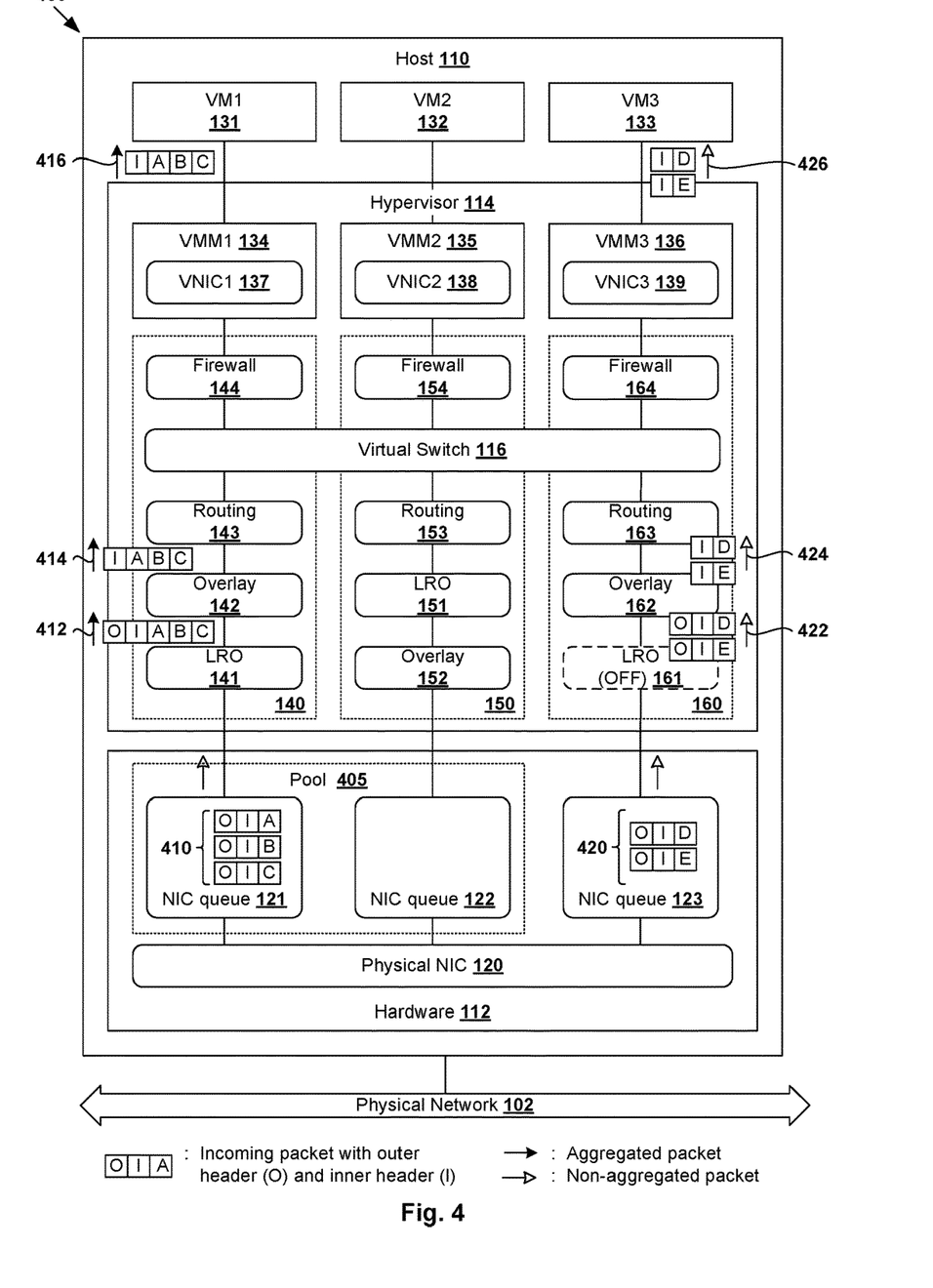
FIG. 4 is a schematic diagram illustrating a first example of LRO processing in a virtualized computing environment.

In another example, incoming packets destined for VM3 133 are assigned to third NIC queue 123, such as packets labelled "D" and "E" (see 420 in FIG. 4). At third networking service pipeline 160 associated with third NIC queue 123, packet aggregation service 161 (shown in dashed line) is disabled and not performed (see 422 in FIG. 4). Overlay service 162 performs decapsulation to remove the outer header of each incoming packet (see 422 and 424 in FIG. 4). Subsequent packet processing is performed by routing service 163, virtual switch 116 and firewall service 164. Once all networking services are performed, the output (i.e., processed non-aggregated packets) is forwarded to VM3 133 via VNIC3 139 (see 426 in FIG. 4).

(b) Packet Aggregation and Splitting

Another issue relating to packet aggregation is that physical NIC 120 may not have the ability to determine which packets should be aggregated and which should not (unlike in the example in FIG. 4). In this case, according to examples of the present disclosure, packet aggregation may be implemented by default at hypervisor 114, and packet splitting selectively performed for virtual machines that do not support large packets. This generally improves the performance of networking services that have LRO capability, but increases packet processing overhead associated with packet aggregation and splitting. To improve the efficiency of packet splitting, packet boundary information associated with the incoming packets may be maintained.

Figure 5:
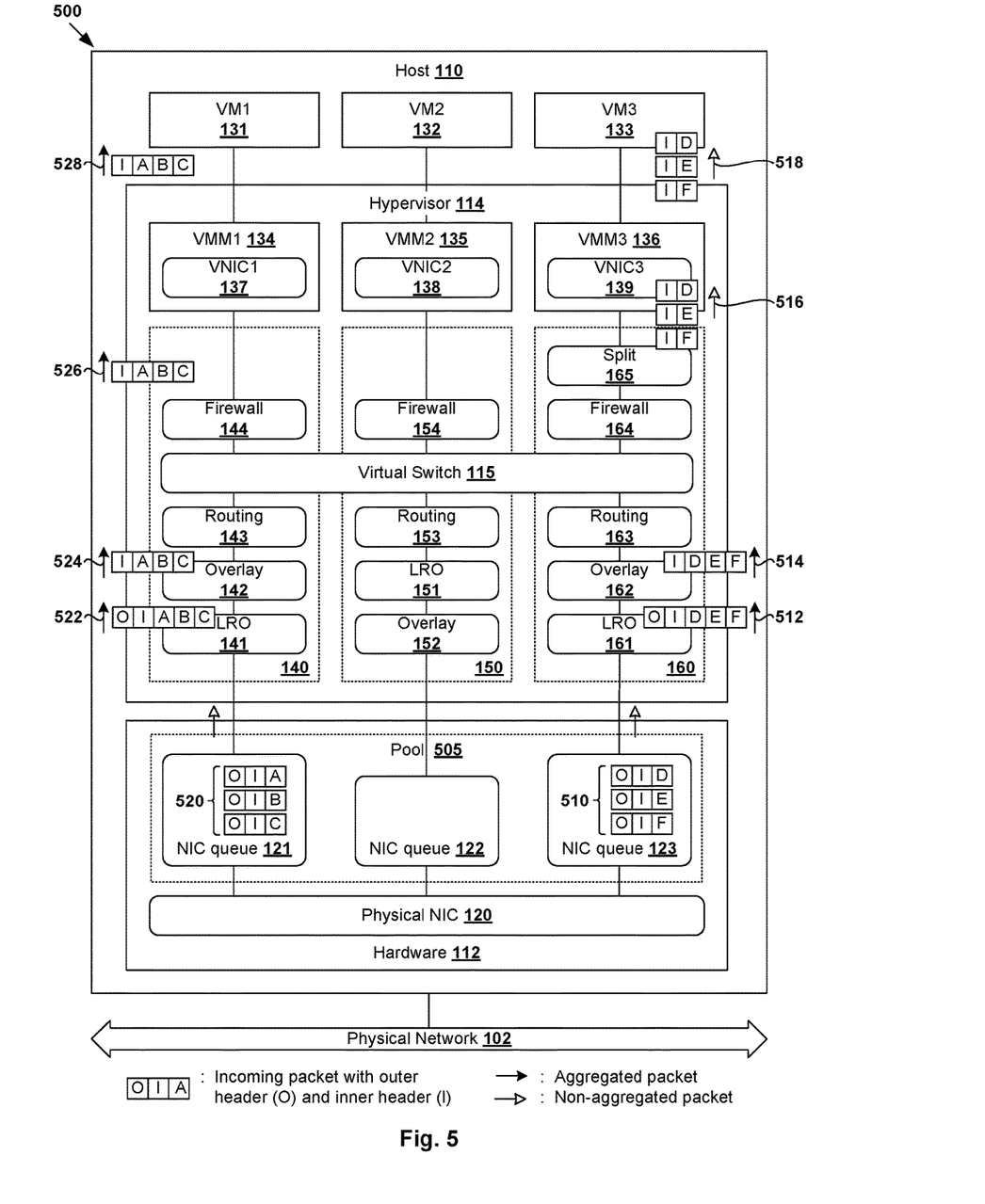
FIG. 5 is a schematic diagram illustrating a second example of LRO processing in a virtualized computing environment.

FIG. 5 is a schematic diagram illustrating second example 500 of LRO processing in virtualized computing environment 100. In the example in FIG. 5, packet aggregation is implemented by default, and packet aggregation service 141/151/161 is enabled at each networking service pipeline 140/150/160 according to block 310 in FIG. 3. In this case, pool 505 may be configured to include all NIC queues 121-123. Further, since VM3 133 does not have LRO capability, third networking service pipeline 160 is further configured with packet splitting service 165 to generate smaller packets that can be handled by VM3 133.

During packet processing, incoming packets labelled "D," "E" and "F" destined for VM3 133 are received via third NIC queue 123 (see 510 in FIG. 5). Packet aggregation service 161 aggregates the incoming packets to form an aggregated packet (see 512 in FIG. 5) that includes an outer header (labelled "O"), an inner header (labelled "I"), and payload information of the incoming packets. The aggregated packet is then processed by overlay service 162 to remove the outer header (see 514 in FIG. 5), routing service 163, virtual switch 116 and firewall service 164. Once it reaches packet splitting service 165, the aggregated packet is split into smaller packets (see 516 in FIG. 5), which are then forwarded to VM3 133 via VNIC3 139 (see 518 in FIG. 5). See also corresponding blocks 320 to 370 in FIG. 3.

In practice, packet aggregation and subsequent processing may cause the boundary of the original incoming packets to be completely lost. To maintain packet boundary during packet splitting, packet aggregation service 161 may be configured to link an aggregated packet with packet boundary information associated with the incoming packets (i.e., prior to aggregation) according to block 341 and 342 in FIG. 3. In one example, the packet boundary information may be a packet list that includes memory address information associated with each incoming packet. For example in FIG. 5, first packet labelled "D" may be stored (in memory) at address=ADD1, second packet labelled "E" at ADD2 and third packet labelled "F" at ADD3. In this case, aggregated packet 512/514 may be represented internally using another data structure that contains a link to ADD1, ADD2 and ADD3.

It should be understood that, during packet aggregation, it is not necessary to assemble multiple incoming packets (see 510 in FIG. 5) to form aggregated packet 512/514. Instead, aggregated packet 512/514 may be simulated or internally represented using a packet list that identifies various segment offsets associated with respective (smaller) incoming packets. Further, packet aggregation service 161 may be configured to attach a "pseudo header" to the packet list. Depending on the service point of packet aggregation service 161 within pipeline 160, the pseudo header may include any suitable header information (i.e., outer header and/or inner header) required by subsequent services, such as overlay network inforamtion, layer-2 information, layer-3 information, layer-4 information, any combination thereof, etc. This reduces the overhead at packet aggregation service 161 when performing packet aggregation using software rather than in NIC queue 123 (i.e., hardware). Also, by configuring the pseudo header, processing overhead may be reduced at subsequent services because they only need to refer to the pseudo header during classification or processing. Further, since the original incoming packets and packet list are maintained, the overhead at packet splitting service 165 should be trivial.

According to blocks 345 and 346 in FIG. 3, packet splitting service 165 may retrieve the packet boundary information, based on which packet splitting is performed (see 516 and 518 in FIG. 5 again). This approach should be contrasted against conventional approaches that split up the packet blindly, such as based on maximum segment size (MSS), etc. By maintaining packet boundary, data and heuristics that are inferrable from the original incoming packets may be retained.

(c) Dynamic Service Point

Figure 6:
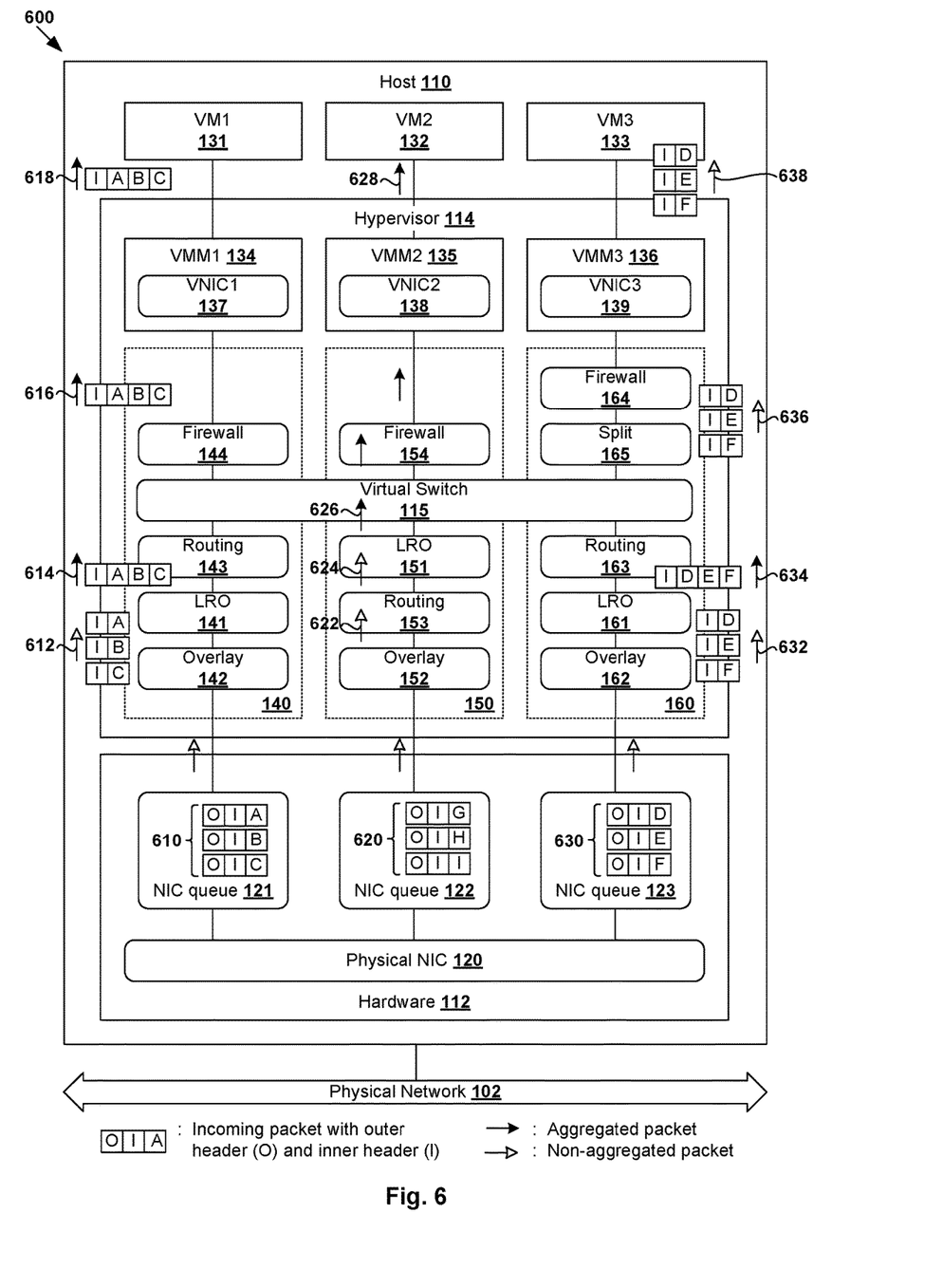
FIG. 6 is a schematic diagram illustrating a third example of LRO processing in a virtualized computing environment.

As described using FIG. 1, not all networking services have LRO capability, such as when third-party networking services are added to networking service pipeline 140/150/160. In this case, according to examples of the present disclosure, networking service pipeline 140/150/160 may be configured with a dynamic service point for packet aggregation based on the LRO capability of other networking service(s). This approach may also be used when physical NIC 120 may not have the ability to determine which packets should be aggregated and which should not (unlike in the example in FIG. 4). Some examples are shown in FIG. 6, which is a schematic diagram illustrating third example 600 of LRO processing in virtualized computing environment 100.

At first networking service pipeline 140, since overlay service 142 does not have LRO capability, packet aggregation service 141 is enabled at a service point between overlay service 142 and routing service 143 at block 310 in FIG. 3. As such, instead of performing packet aggregation at the beginning of first networking service pipeline 140, a different service point is determined for packet aggregation service 141. During packet processing, incoming packets 610 are decapsulated by overlay service 142 (see 612 in FIG. 6) before they are aggregated by packet aggregation service 141 (see 614 in FIG. 6). The aggregated packet is then processed using routing service 143, virtual switch 116 and firewall service 144 before being forwarded to VM1 131 via VNIC1 137.

At second networking service pipeline 150, a different configuration is used for illustrative purposes. In this example, since overlay service 152 and routing service 153 do not have LRO capability, packet aggregation service 151 is enabled at a service point after both overlay service 152 and routing service 153 at block 310 in FIG. 3. As such, during packet processing, incoming packets 620 received via NIC queue 122 are processed by overlay service 152 (see 622 in FIG. 6) and routing service 153 (see 624 in FIG. 6) before they are aggregated by packet aggregation service 151 (see 626 in FIG. 6). The aggregated packet is then processed by virtual switch 116 and firewall service 154 before being forward to VM2 132 via VNIC2 138 (see 628 in FIG. 6).

At third networking service pipeline 160, routing service 163 and virtual switch 116 have LRO capability, but overlay service 162 and firewall service 164 do not. Once again, packet aggregation service 161 is enabled at a first service point at block 310 in FIG. 3, i.e., between overlay service 162 and routing service 163 based on their LRO capability. Additionally, packet splitting service 165 is enabled at a second service point, i.e., between virtual switch 116 and firewall service 164, further along third networking service pipeline 160. The configuration of packet splitting service 165 therefore takes into account of the LRO capability of firewall service 164 and VM3 133.

During packet processing, incoming packets 630 labelled "D," "E" and "F" are decapsulated by overlay service 162 (see 632 in FIG. 6) before they are aggregated by packet aggregation service 161 (see 634 in FIG. 6) at the first service point. The aggregated packet is then processed by routing service 163 and virtual switch 116, before being fragmented into smaller packets (see 636 in FIG. 6) by packet splitting service 165 at the second service point. The smaller, non-aggregated packets are subsequently processed by firewall service 164 and forwarded to VM3 133 (see 638 in FIG. 6). Similar to the example in FIG. 5, packet splitting may be performed more efficiently using packet boundary information associated with incoming packets 630. See corresponding blocks 341, 342, 345 and 346 in FIG. 6.

In practice, once a networking service is registered, the networking service may advertise whether it can support large, aggregated packets or otherwise. If there is no advertisement, it may be assumed that the networking service does not have LRO capability. In this case, a packet splitting service that is configured to perform packet splitting may be enabled at a service point before that networking service. If the networking service has LRO capability, it is not necessary to enable packet splitting before the networking service. As new networking services are added to a pipeline, service-based enabling of packet aggregation and/or packet splitting may be performed automatically.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 6. For example, a computer system capable of acting as host 110 may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a host to perform large receive offload (LRO) processing in a virtualized computing environment, wherein the host includes a physical network interface controller (NIC) and a networking service pipeline having a packet aggregation service and multiple networking services and supports a virtualized computing instance, and the method comprises:
   receiving, via the physical NIC, incoming packets that are destined for the virtualized computing instance, wherein prior to receiving the incoming packets, enabling a packet splitting service at another service point along the networking service pipeline based on an LRO capability of the virtualized computing instance, or an LRO capability of at least one of the multiple networking services, or both;
   processing the incoming packets to generate at least one processed packet using the networking service pipeline, wherein the packet aggregation service is configured to aggregate the incoming packets into an aggregated packet, and enabled at a service point along the networking service pipeline based on an LRO capability of at least one of the multiple networking services to process the aggregated packet, and
   wherein the aggregated packet is split by the packet splitting service at the another service point into multiple non-aggregated packets; and
   forwarding the at least one processed packet generated by the networking service pipeline to the virtualized computing instance.

2. The method of claim 1, wherein processing the incoming packets comprises:
   splitting, by the packet splitting service, the aggregated packet based on packet boundary information associated with the incoming packets.

3. The method of claim 2, wherein processing the incoming packets comprises:
   linking, by the packet aggregation service, the aggregated packet with the packet boundary information that includes memory address information associated with the incoming packets.

4. The method of claim 1, wherein receiving the incoming packets comprises:
   retrieving the incoming packets from a NIC queue that belongs to a pool of multiple NIC queues at the physical NIC that are configured to hold incoming packets destined for multiple virtualized computing instances that have LRO capability.

5. The method of claim 4, wherein the method further comprises:
   prior to receiving the incoming packets, enabling the packet aggregation service at the service point along the networking service pipeline associated with the NIC queue.

6. A non-transitory computer-readable storage medium that includes a set of instructions which, in response to execution by a processor of a host, cause the processor to implement a method of large receive offload (LRO) processing in a virtualized computing environment, wherein the host includes a physical network interface controller (NIC) and a networking service pipeline having a packet aggregation service and multiple networking services and supports a virtualized computing instance, and the method comprises:
   receiving, via the physical NIC, incoming packets that are destined for the virtualized computing instance, wherein prior to receiving the incoming packets, enabling a packet splitting service at another service point along the networking service pipeline based on an LRO capability of the virtualized computing instance, or an LRO capability of at least one of the multiple networking services, or both;
   processing the incoming packets to generate at least one processed packet using the networking service pipeline, wherein the packet aggregation service is configured to aggregate the incoming packets into an aggregated packet and enabled at a service point along the networking service pipeline based on an LRO capability of at least one of the multiple networking services to process the aggregated packet, and
   wherein the aggregated packet is split by the packet splitting service at the another service point into multiple non-aggregated packets; and
   forwarding the at least one processed packet generated by the networking service pipeline to the virtualized computing instance.

7. The non-transitory computer-readable storage medium of claim 6, wherein processing the incoming packets comprises:
   splitting, by the packet splitting service, the aggregated packet based on packet boundary information associated with the incoming packets.

8. The non-transitory computer-readable storage medium of claim 7, wherein processing the incoming packets comprises:
   linking, by the packet aggregation service, the aggregated packet with the packet boundary information that includes memory address information associated with the incoming packets.

9. The non-transitory computer-readable storage medium of claim 6, wherein receiving the incoming packets comprises:
   retrieving the incoming packets from a NIC queue that belongs to a pool of multiple NIC queues at the physical NIC that are configured to hold incoming packets destined for multiple virtualized computing instances that have LRO capability.

10. The non-transitory computer-readable storage medium of claim 9, wherein the method further comprises:
    prior to receiving the incoming packets, enabling the packet aggregation service at the service point along the networking service pipeline associated with the NIC queue.

11. A host configured to perform large receive offload (LRO) processing in a virtualized computing environment, wherein the host comprises:
    a processor;
    a physical network interface controller (NIC);
    a networking service pipeline having a packet aggregation service and multiple networking services; and
    a non-transitory computer-readable medium having stored thereon instructions that, when executed by the processor, cause the processor to:
      receive, via the physical NIC, incoming packets that are destined for a virtualized computing instance supported by the host, wherein prior to receiving the incoming packets, enabling a packet splitting service at another service point along the networking service pipeline based on an LRO capability of the virtualized computing instance, or an LRO capability of at least one of the multiple networking services, or both;

process the incoming packets to generate at least one processed packet using the networking service pipeline, wherein the packet aggregation service is configured to aggregate the incoming packets into an aggregated packet and enabled at a service point along the networking service pipeline based on an LRO capability of at least one of the multiple networking services to process the aggregated packet, and wherein the aggregated packet is split by the packet splitting service at the another service point into multiple non-aggregated packets; and forward the at least one processed packet generated by the networking service pipeline to the virtualized computing instance.

12. The host of claim 11, wherein the instructions for processing the incoming packets cause the processor to:

split, by the packet splitting service, the aggregated packet based on packet boundary information associated with the incoming packets.

13. The host of claim 12, wherein the instructions for processing the incoming packets cause the processor to:

link, by the packet aggregation service, the aggregated packet with the packet boundary information that includes memory address information associated with the incoming packets.

14. The host of claim 11, wherein the instructions for receiving the incoming packets cause the processor to:

retrieve the incoming packets from a NIC queue that belongs to a pool of multiple NIC queues at the physical NIC that are configured to hold incoming packets destined for multiple virtualized computing instances that have LRO capability.

15. The host of claim 14, wherein the instructions further cause the processor to:

prior to receiving the incoming packets, enable the packet aggregation service at the service point along the networking service pipeline associated with the NIC queue.

* * * * *